( 12 ) United States Patent
Burbank et al.

(10) Patent No.: US 10,597,894 B2
(45) Date of Patent: Mar. 24, 2020

(54) SUPPORT MEMBER FOR SUPPORTING ELECTRICAL POWER LINES

(71) Applicant: GEOTEK, LLC, Stewartville, MN (US)

(72) Inventors: Tyler R. Burbank, Stewartville, MN (US); Ricardo Felty, Stewartville, MN (US); Bruce Blumentritt, Stewartville, MN (US); Eugene Flowers, Stewartville, MN (US); Brian Hornberg, Stewartville, MN (US); David Sheldon, Stewartville, MN (US); Michael Steven Schoenoff, Rochester, MN (US)

(73) Assignee: GEOTEK, LLC, Stewartville, MN (US)

( * ) Notice: Subject to any disclaimer, the term of this patent is extended or adjusted under 35 U.S.C. 154(b) by 0 days.

(21) Appl. No.: 15/782,531

(22) Filed: Oct. 12, 2017

(65) Prior Publication Data

US 2018/0100323 A1 Apr. 12, 2018

Related U.S. Application Data

(60) Provisional application No. 62/407,471, filed on Oct. 12, 2016.

(51) Int. Cl.
*E04H 12/00* (2006.01)
*E04H 12/24* (2006.01)
*H02G 7/05* (2006.01)
*H01B 17/16* (2006.01)

(Continued)

(52) U.S. Cl.
CPC .............. *E04H 12/24* (2013.01); *H02G 7/05* (2013.01); *H01B 17/16* (2013.01); *H01B 17/38* (2013.01); *H02G 7/20* (2013.01)

(58) Field of Classification Search
CPC ...... E04H 12/2292; E04H 12/24; H02G 7/05; H02G 7/20; H02G 1/02; H02G 7/00
USPC .... 52/309.15, 697, 40, 651.03, 651.02, 835, 52/651.08, 651.06, 651.07; 248/218.4, 248/219.2; 343/721
See application file for complete search history.

(56) References Cited

U.S. PATENT DOCUMENTS 3,574,104 A * 4/1971 Medler ................. B29C 53/562
138/144
4,262,047 A * 4/1981 Barnett ................ B29D 24/005
428/73

(Continued)

FOREIGN PATENT DOCUMENTS

WO 2015/195807 12/2015

*Primary Examiner* — Chi Q Nguyen
(74) *Attorney, Agent, or Firm* — Hamre, Schumann, Mueller & Larson, P.C.

(57) ABSTRACT

A support system for supporting power distribution or transmission lines includes a support pole having a first end and a second and a crossarm attached to the support pole, proximate the first end of the support pole. The crossarm has a first end, a second end and one or more side walls extending between the first and second ends of the crossarm. The side walls of the crossarm define an elongated interior space. The support system further includes an internal conduit formed in the interior space of the crossarm. The internal conduit extends along an axial direction of the crossarm. The internal conduit is made from insulative material.

15 Claims, 5 Drawing Sheets

(51) Int. Cl.
   *H02G 7/20*     (2006.01)
   *H01B 17/38*    (2006.01)

(56) References Cited

U.S. PATENT DOCUMENTS

| | | | |
|---|---|---|---|
| 6,347,488 B1* | 2/2002 | Koye | E04H 12/24 |
| | | | 174/146 |
| 6,609,345 B2* | 8/2003 | Schauf, Sr. | E04C 3/29 |
| | | | 428/327 |
| 8,984,834 B1* | 3/2015 | Butler | H02G 7/05 |
| | | | 248/218.4 |
| 9,394,716 B2* | 7/2016 | Butler | E04H 12/04 |
| 9,784,408 B2* | 10/2017 | Bennett | F16M 13/02 |
| 2002/0095904 A1* | 7/2002 | Fingerson | E04H 12/24 |
| | | | 52/651.02 |
| 2003/0041553 A1* | 3/2003 | Schauf, Sr. | E04C 3/29 |
| | | | 52/309.7 |
| 2014/0158418 A1* | 6/2014 | Crespo | H02G 7/05 |
| | | | 174/45 R |
| 2015/0114678 A1* | 4/2015 | Lynch | H02G 7/00 |
| | | | 174/66 |
| 2016/0233657 A1* | 8/2016 | Ceko | E04H 12/24 |
| 2018/0334293 A1* | 11/2018 | Kadel | E04H 12/24 |

* cited by examiner

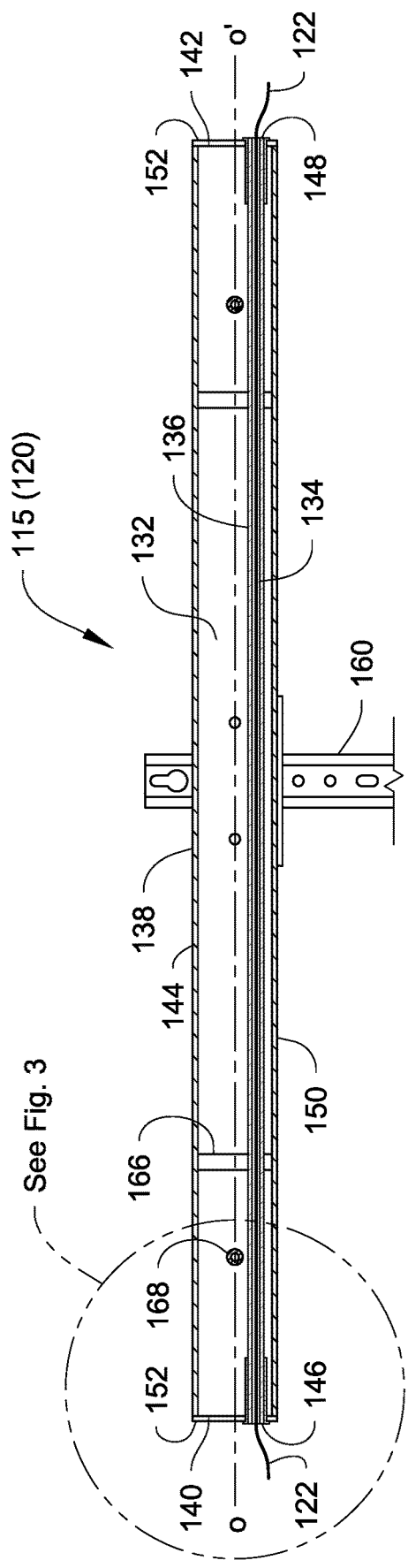

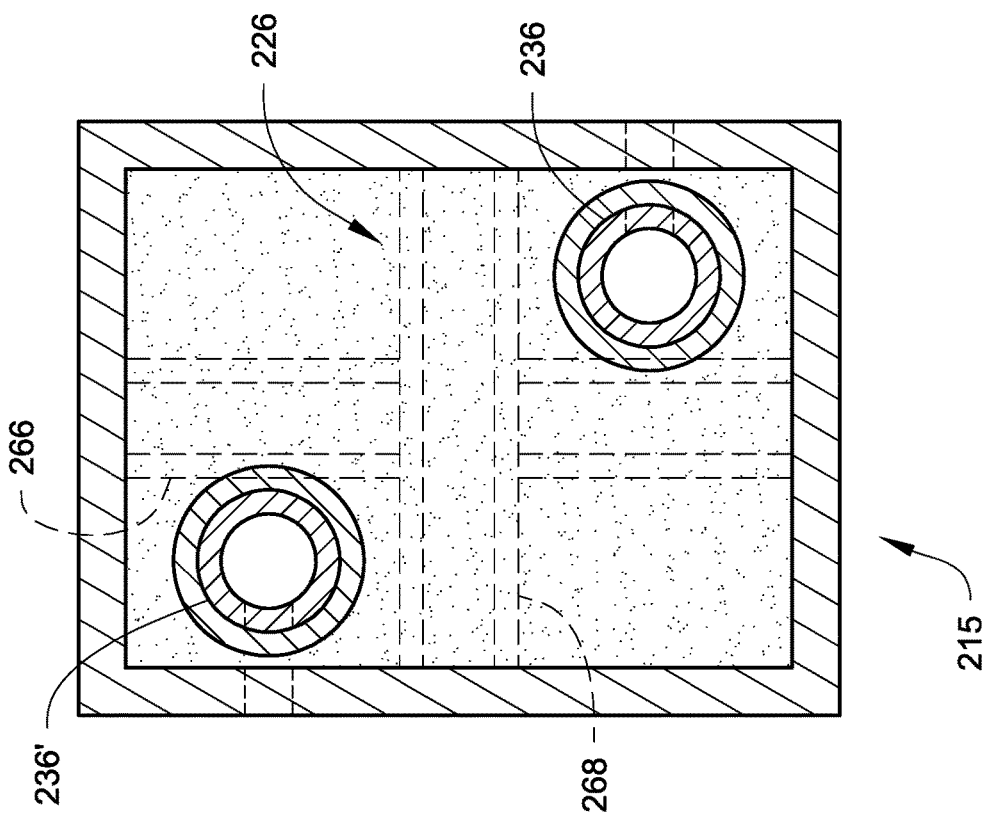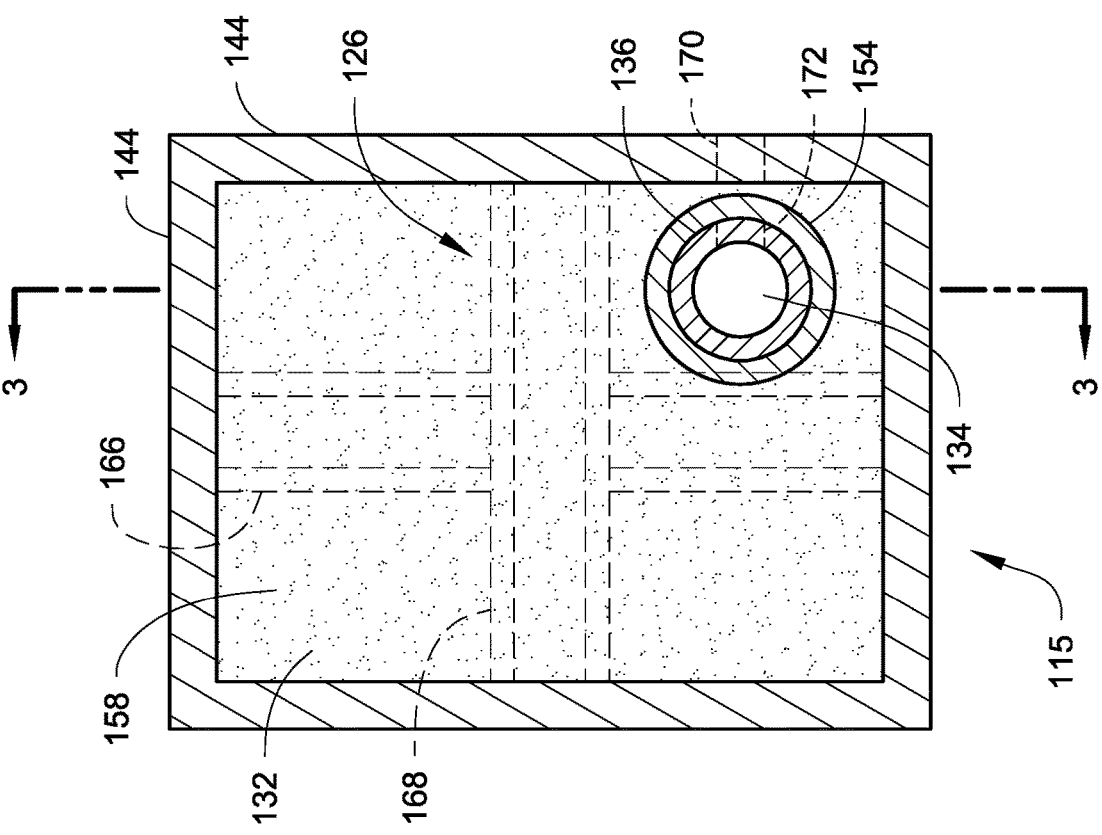

SUPPORT MEMBER FOR SUPPORTING ELECTRICAL POWER LINES

FIELD

This disclosure relates generally to power line support systems that support power distribution or transmission lines, and particularly, but not by way of limitation, to power line support members having a self-contained path and methods of making and using the support members.

BACKGROUND

In electrical power distribution and transmission processes, utility poles or transmission towers can be used to support overhead power lines. Support members of utility poles or transmission towers, such as crossarms, are attached near the top of utility poles or transmission towers. Support members can be used to position and support power lines, insulators, other power transmission members and hardware, such as transformers, guy-wires, etc. In addition to supporting power lines, support members may have bonding wires or grounding wires attached to the outside surface of crossarms. For wood support members, these external wires can be attached to the exterior surface of the support members, and for fiberglass support members, metal clips may be used to attach the bonding or grounding wires. In either case, these wires are exposed to corrosive environmental elements, such as water, debris or the like, and to utility line workers servicing the power system.

SUMMARY

Some embodiments of a support system for supporting power distribution or transmission lines can include a power line support member. The support member can be any load bearing member of power line support systems such as utility poles, power transmission towers, etc. Examples of power line support members include support poles, crossarms, braces, etc. In some embodiments, a support member can include a self-contained path taking the form of an internal conduit. The internal conduit extends along an axial direction of the support member. In some embodiments, the internal conduit is configured to enclose the entire conductive wire it carries. In further embodiments, the internal conduit is made of an insulative material. In even further embodiments, the internal conduit is formed in a horizontally positioned support member. In some embodiments, the internal conduit is integrally formed within a wall of the support member. In other embodiments, the internal conduit is assembled into the interior space of the support member.

Particular embodiments include a support system for supporting power distribution or transmission lines. The support system includes a support pole having a first end and a second; and a crossarm attached to the support pole, proximate to the first end of the support pole. The crossarm has a first end, a second end and one or more side walls extending between the first and second ends of the crossarm. The side walls of the crossarm define an elongated interior space. The support system further includes an internal conduit formed in the interior space of the crossarm. The internal conduit extends along an axial direction of the crossarm. The internal conduit is made from insulative material.

In some embodiments, a support member for supporting power distribution or transmission lines includes an elongated body; a first end and a second end; one or more side walls extending between the first and second ends; an interior space defined by the side walls; and an internal conduit extending along an axial direction of the support member in the interior space.

Other embodiments may include a method of making a power line support member. The method includes forming a support member body having side walls, the side walls defining an interior space; forming an internal conduit in the interior space along an axial direction of the support member body; and disposing filling material into the interior space to support and retain the internal conduit.

Further embodiments may include a method of using a power line support member. The method includes inserting a bonding wire in an internal conduit of the power line support member; connecting one end of the bonding wire to a first electrical component used in association with the power line support member, such as an insulator pin that secures an insulator to the support member; and connecting another end of the bonding wire to a second electrical component, such as another insulator pin that secures another insulator to the same support member for equipotential bonding.

Even further embodiments may include a method of using a power line support member. The method includes inserting a grounding wire in an internal conduit of the power line support member; connecting one end of the grounding wire to an electrical component used in association with the power line support member, and connecting another end of the grounding wire to a ground post for grounding.

These and other embodiments described herein may provide one or more of the following benefits. First, a power line support member having a self-contained wiring path can help shield the conductive wire it carries from electrical interference of other current carrying components of the power line support system, such as metal mounts. Second, a power line support member having a self-contained path can help prevent the wire it carries from being exposed to corrosion, contamination, and handling damage, as well as from damage caused by vandals or wild animals. In such circumstances, deterioration of the power line can be avoided. As a result, the power line can be more effectively maintained. Third, the self-contained path taking the form of an internal conduit can help prevent human beings, such as utility line workers, other electrical workers, or animals from inadvertent contacting an active power line so as to effectively avoid electrical shocks or electrocution. Fourth, the internal conduit allows easy alignment of a wire path. This helps maintain the seal between components disposed in an interior space of the power line support member and the outside environment. In addition, this can help reduce the time that a utility line worker needs to spend on attaching the conductive wire to the exterior surface of the power line support member.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 2 illustrates a sectional view of a further embodiment of a power line support member having a self-contained wiring path.

FIG. 3 is an enlarged view showing a first end of the power line support member of in FIG. 2.

FIG. 4 is a cross sectional view of the first end of the power line support member of FIG. 3 along line 4-4.

FIG. 5 is a cross sectional view of a power line support member having two internal conduits.

Like reference symbols in the various drawings indicate like elements.

DETAILED DESCRIPTION

As used herein, the term "power line support member" or "power line support members" refer to any load bearing member of power line support systems such as utility poles, power towers, etc. In some embodiment, the power line support member can be used to support other utility lines, such as phone lines. Examples of power line support members include support pole, crossarms, braces, etc. The term "proximate" refers to a physical relationship that includes being at, on, and near.

It is to be understood that the use of a support member with an internal conduit is not limited to power line support systems, such as a utility pole or an electrical tower. The support member with an internal conduit can be used in other applications, as long as an internal conduit is useful to enclose a conductive wire to avoid electrical interference. For example, the internal conduit can be used in antennas and other wires for communications systems. This internal conduit can also be used for sensors for power system grid maintenance.

For ease of the description, the support member with an internal conduit is described as a crossarm with an internal conduit used in a utility pole system. However, it is to be understood that the support member with an internal conduit can also be used in other suitable applications.

Figure 1A:
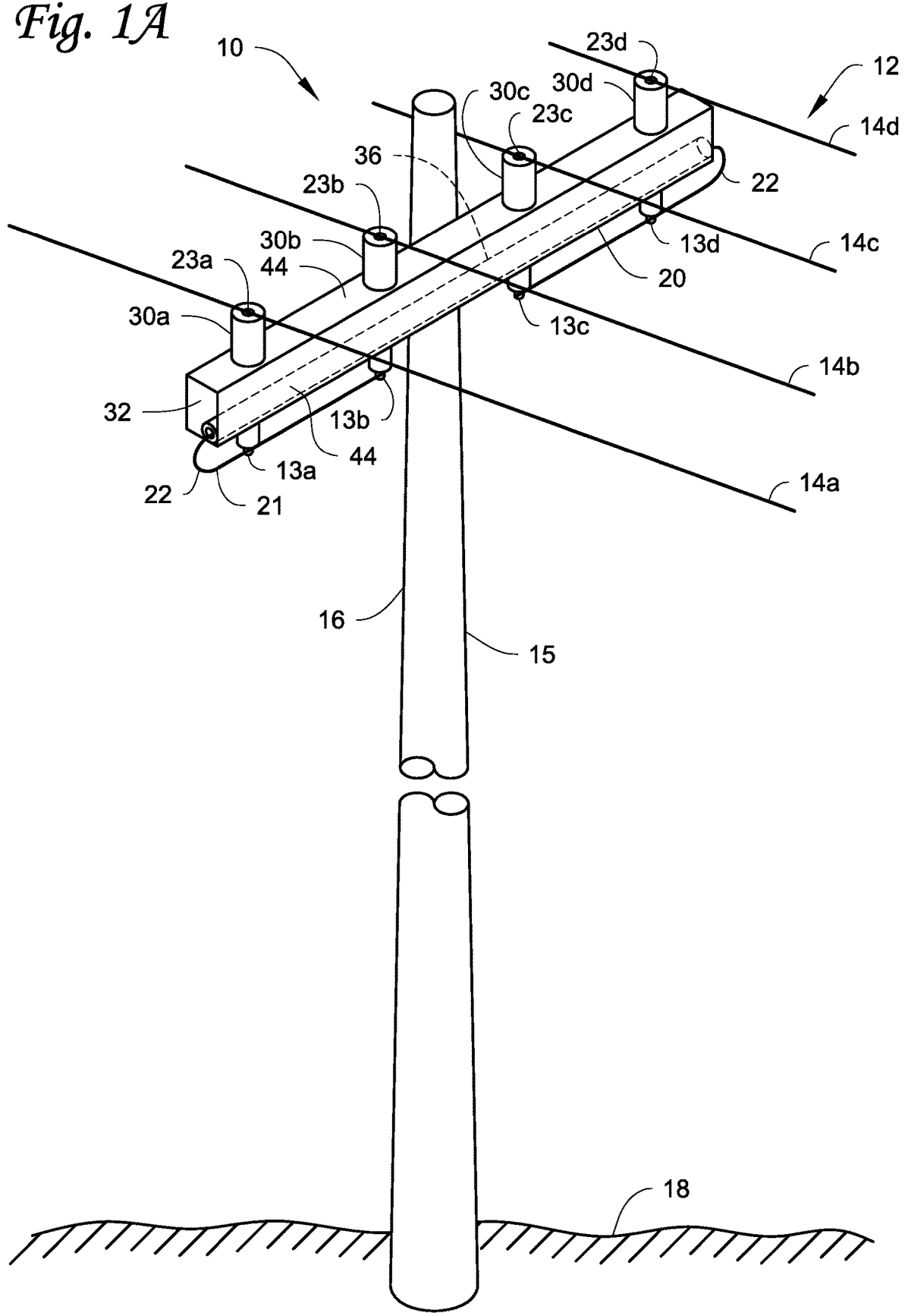
FIG. 1A illustrates a schematic view of a power line support system including a bonding wire.

FIG. 1A is a schematic view of a power line support system 10 for supporting power distribution or transmission lines 12, such as power lines 14a, 14b, 14c, 14d. In some embodiments, the power lines 14a, 14b, 14c, 14d can be power distribution lines. Power distribution lines include primary distribution lines and secondary lines. Primary lines typically have voltages ranging from 120 to 35,000 volts. Common primary line voltages are 2,300, 4,160, 12,470, 13,800, 25,000 and 34,500 volts depending on which distribution voltages a utility uses. Common secondary line voltages (the lines that go to the home) are 120 volts or 240 volts.

In other embodiments, the power lines 14a, 14b, 14c, 14d can be power transmission lines. Transmission-level voltages are usually considered to be 69,000 volts and above.

In some embodiments, the support system 10 can be used to support other utility lines, such as phone lines.

Still referring to FIG. 1A, in the embodiment depicted, the support system 10 takes the form of a utility pole. The support system 10 includes various types of power line support members 15, such as a support pole 16 extending upwardly from a ground surface 18, and a crossarm 20 coupled to the support pole 16 for supporting the power lines 14a, 14b, 14c, 14d.

In some embodiments, the support pole 16 can be made of structural polymeric materials, such as fiberglass composite materials. However, it is to be understood that the support pole 16 may be formed from any suitable material that functions to support one or more power lines. For example, the support pole 16 can be made of other materials, such as, concrete, metal such as steel, wood, etc.

The crossarm 20 depicted in FIG. 1A is made of fiberglass composite materials. However, it is to be understood that the crossarm 20 may be formed from any suitable material that functions to support the power lines 14a, 14b, 14c, 14d. In the embodiment depicted in FIG. 1A, the crossarm 20 includes a plurality of side walls 44 and an interior space 32 defined by the side walls 44. It is to be understood that although a cross section of the crossarm 20 is depicted as a rectangular shape, the cross section of the crossarm 20 can be in other shapes, such as square, circular, oval, elliptical, etc.

It is also to be understood that the crossarm 20 can be coupled to the support pole 16 at any suitable location. In the embodiment depicted, the crossarm 20 is coupled to the support pole 16 by fasteners at a location proximate an upper end of the support pole 16. In the embodiment depicted, the crossarm 20 includes insulators 30a, 30b, 30c, 30d for supporting power lines 14a, 14b, 14c, 14d respectively at joints 23a, 23b, 23c, 23d.

Each of the power lines 14a, 14b, 14c, 14d is intended to carry the same voltage, with no potential difference between the wires. However, potential differences between electrical components of the power line support system 10 often occur in the real world. In such a case, especially in high contaminant areas like coastal regions, contaminants tend to deposit on the surface of crossarms 20. As a result, a conductive path can be formed for electricity to pass on the surface of the crossarms 20 due to the contaminant deposits, if there is a significant potential difference between the electrical components. In such circumstances, the once electrically insulated surface can become conductive.

A conductive wire can be used to solve this issue by bonding two or more electrical components together. On crossarms 20, bonding is done by connecting electrical components, such as insulator pins 13a, 13b, 13c, 13d used to respectively secure insulators 30a, 30b, 30c, 30d to the crossarm 20. The insulators 30a, 30b, 30c, 30d are used to anchor power lines 14a, 14b, 14c, 14d to the crossarm 20. Bonding ensures that each of electrical components, for example, insulator pins 13a, 13b, 13c, 13d will be at the same electrical potential. As a result, electricity would not be built up between electrical components, such as insulator pins 13a, 13b, 13c, 13d in this embodiment. No current flow can take place between two bonded bodies because they have the same potential.

In the embodiment depicted in FIG. 1A, a self-contained wiring path 34 is formed in the interior space 32 of the crossarm 20. The self-contained wiring path 34 is enclosed by a tube 35 defining an internal conduit 36 extending axially through the interior space 32 of the crossarm 20. The internal conduit 36 is configured to contain the conductive wire 22 to prevent the conductive wire 22 from extraneous contacts. As discussed above, the conductive wire 22 can be a bonding wire 21. In the embodiment depicted, the bonding wire 21 extends through the entire length of the crossarm 20. The two ends of the bonding wire 21 exit from the two ends of the crossarm 20 respectively. The bonding wire 21 is then configured to connect the lower ends of two or more insulator pins 13a, 13b, 13c, 13d located underneath the lower surface of the crossarm 20.

Figure 1B:
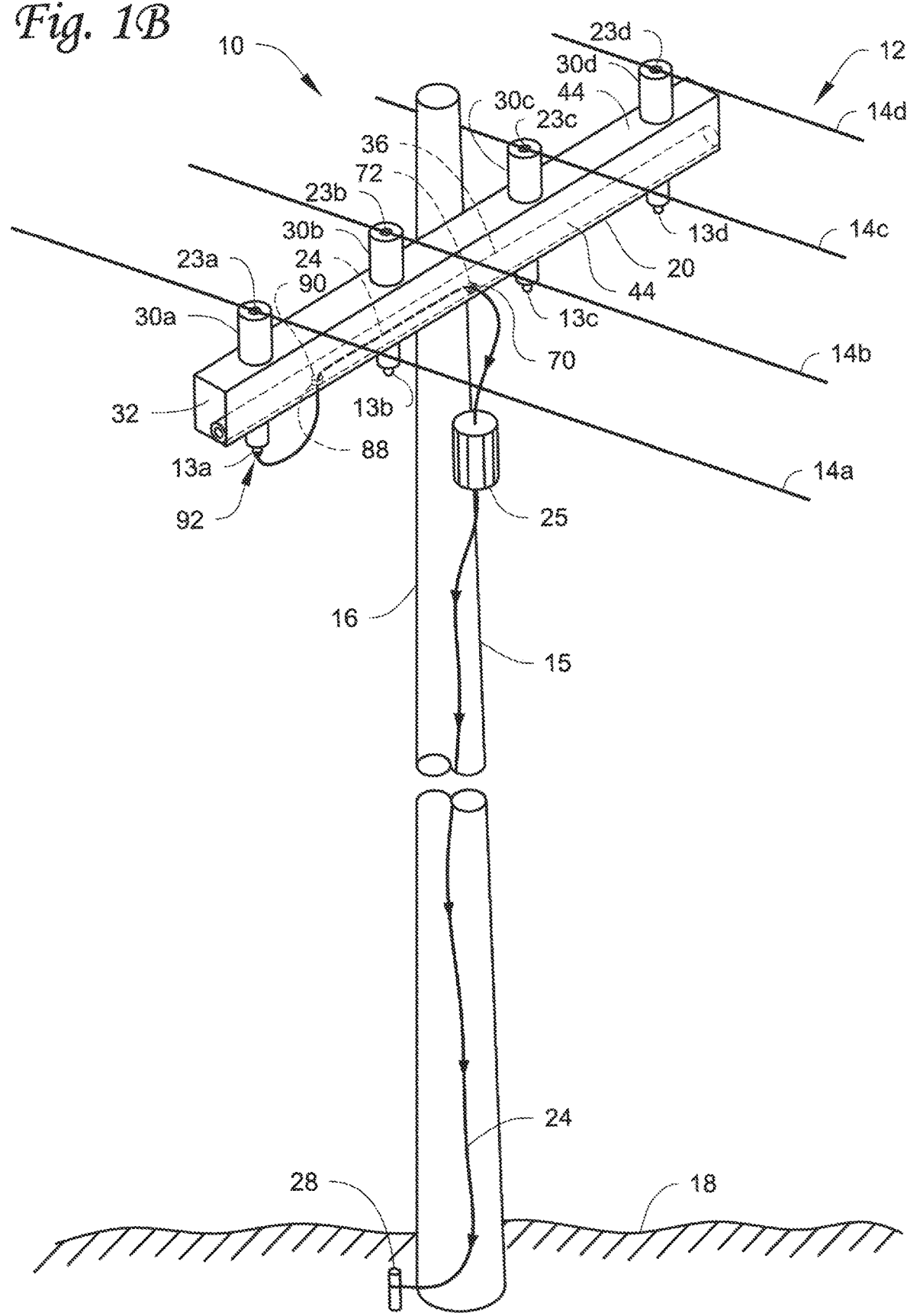
FIG. 1B illustrates a schematic view of a power line support system including a grounding wire.

Alternatively, referring to FIG. 1BA, the conductive wire 22 can also be a grounding wire 24 which may have similar issues and needs to be protected from electrical interference and corrosive environmental damages. As a result, the internal conduit 36 can help provide a protected conduit path, and thus helps shield the conductive wire 22 from electrical interference of other current carrying components of the support system 10. In addition, the internal conduit 36 can help prevent the conductive wire 22 from corrosive environmental damage, and protect utility line workers and animals from inadvertent contact with the conductive wire 22.

Still referring to FIG. 1B, the power distribution or transmission line 12 may also include a grounding wire 24 coupled at an upper end to an electrical component that needs to be grounded at a connection point 92 and at a lower end to a ground post 28 embedded in the earth 18. A transformer 25 can be coupled to the grounding wire 24. When the grounding wire exits the transformer 25, it extends along the support pole 16 and enters the internal conduit 36 through an opening 70 defined in the side wall 44 of the crossarm 20 and then an opening 72 defined in a side wall of the internal conduit 36. It is to be understood that the opening 70 from which the grounding wire 24 enters the interior space 32 of the crossarm 20 can be defined at any location of the side wall 44, and the opening 72 from which the grounding wire 24 enters the internal conduit 36 can be defined at any location of the side wall of the internal conduit 36.

The grounding wire 24 can then exit from an end of the internal conduit 36 and then can be coupled to the electrical component that needs to be grounded. Alternatively, the grounding wire 24 can exit from an opening 90 defined in the side wall of the internal conduit 36 and exit from a corresponding opening 88 defined in the side wall 44 of the crossarm 20, and then coupled to the electrical component that needs to be grounded. It is to be understood that the location of the opening 90 at the side wall of the internal conduit 36 or the location of the opening 90 at the side wall 44 of the crossarm 20 can vary as desired. Alternatively, the grounding wire can exit from one end of the internal conduit 36 instead of exiting from the internal conduit 36 via the opening 90 defined in the side wall of the internal conduit 36.

It is to be understood that the internal conduit 36 can be used to contain a grounding wire that is coupled to any electrical component in the support system 10 that needs to be grounded.

In the embodiment depicted, the grounding wire 24 is a wire formed from copper. However, it is to be understood that the present disclosure contemplates any suitable size and any suitable material for the grounding wire 24. The grounding wire 24 may couple at its lower end to the ground post 28 in any suitable manner.

Referring to FIG. 2, a power line support member 115 having a self-contained wiring path 134 is illustrated. In this embodiment, the support member 115 takes the form of a crossarm 120. However, it is to be understood that the self-contained wiring path 134 can be contemplated for other types of support members 115, for example, support poles, braces, etc. used in power line support systems.

As shown in FIG. 2, the support member 115 includes an elongated body 138 having an axis o-o', a first end 140, a second end 142 and a plurality of side walls 144 extending between the first and second ends 140, 142. The side walls 144 define an interior space 132 in which a self-contained wiring path 134 extends through. FIG. 3 is an enlarged view illustrating the first end 140 of the support member 115 shown in FIG. 2. FIG. 4 is a cross sectional view of the first end 140 of the support member 115 along line 4-4.

As shown in FIGS. 2-4, the self-contained wiring path 134 is enclosed by an internal conduit 136 extending along an axial direction of the support member 115. The internal conduit 136 is configured to contain a conductive wire 122 to prevent the conductive wire 122 from extraneous contacts. The conductive wire 122 can be a bonding wire. Alternatively, the conductive wire 122 can also be a grounding wire which may have similar issues and needs to be protected from electrical interference and corrosive environmental damages. As a result, the internal conduit 136 can help provide a protected conduit path, and thus help shield the conductive wire 122 it carries from electrical interference of other current carrying components of the support member 115. In addition, the internal conduit 136 can help prevent the conductive wire 122 from corrosive environmental damage, and protect utility line workers and animals from inadvertent contact with the conductive wire 122.

As shown in FIGS. 2-4, the internal conduit 136 typically runs throughout the length of the support member 115. When the support member 115 is a crossarm 120, the length of the support member 115 is commonly 8 feet, 10 feet, or 12 feet, but may be up to 56 feet or more. However, it is to be understood that any suitable length can be used for the internal conduit 136

In some embodiments, the inside diameter of the internal conduit 136 can range from about ¼ inches to about ⅞ inches, and the outside diameter of the internal conduit 136 can range from about ½ inches to about 1⅛ inches. However, it is to be understood that any suitable inside and outside diameter can be used for the internal conduit 136. Referring to FIG. 4, the cross section of the internal conduit 136 has a circular shape. However, in some embodiments, the internal conduit 136 can be noncircular in cross section.

Referring to FIGS. 2-4, the internal conduit 136 may be any suitable conduit formed from any suitable material. In some embodiments, the internal conduit 136 is made from rigid or semi-flexible materials, such as polyalkylene (e.g., polyethylene, cross-linked polyethylene, etc.), polyurethane, polyvinyl chloride (PVC), nylon, etc. In some embodiments, the internal conduit 136 is made from the same material as that of the support member 115. In other embodiments, the internal conduit 136 is made from a material different from that of the support member 115. Materials that can be used to make the internal conduit 136 include UV stabilized polyvinyl chloride (PVC), polyethylene, etc.

In some embodiments, the internal conduit 136 can be made of electrical insulative materials, such as insulative polymers. Examples of insulative materials include fiberglass reinforced polymer (FRP). When the internal conduit 136 is made from insulative materials, the internal conduit 136 serves as an insulating member that shields the conductive wire 122 from electrical interference of other metal members.

Referring to FIGS. 2-3, the internal conduit 136 includes a first end 146, a second end 148 and an elongated body 150 extending between the first and second ends 146, 148. In the embodiment depicted in FIGS. 2-4, the internal conduit 136 is positioned parallel to a side wall of the support member 115. It is to be understood that other suitable positioning and other suitable securing methods can be used to secure the internal conduit 136, as desired.

In some embodiments, the support member 115 includes one or more current carrying components 160, such as metal mounts, extending into the interior space 132. In such circumstances, the internal conduit 136 can be routed to circumvent the current carrying components 160 when it extends from the first end 140 to the second end 142 of the support member 115. As a result, when the conductive wire 122 is inserted into the internal conduit 136, the conductive wire 122 is in turn spaced away from the current carrying components 160. Therefore, electrical interference between the conductive wire 122 and the current carrying components 160 can be avoided.

In some embodiments, the path in the internal conduit 136 is sealable by caps 162 when the internal conduit 136 is not in use. When in use, the caps 162 can be taken off to allow access from each of the first and second ends 146, 148 of the internal conduit 136.

As shown in FIGS. 2-3, the support member 115 includes first and second end caps 152 secured to its first and second ends 140, 142, respectively. The interior space 132 can be filled with electrical insulative filling materials 158 to inhibit movement of the internal conduit 136 and improve insulative properties of the support member 115. The insulative filing materials can include an insulative polymer, such as Styrofoam. In some embodiments, the insulative polymer can be a rigid, closed-cell polyurethane foam, a UV stabilized plastic/polymer, PVC, etc. In some embodiments, the filling material 158 completely fills the volume of the interior space 132, enclosing around the internal conduit 136 and filling the volume. The end caps 152 can be made from materials that do not degrade during prolonged elemental or ultraviolet exposure. In some embodiments, the end caps 152 are made of UV stabilized materials, such as UV stabilized polyvinyl chloride (PVC).

In some embodiments, the support member 115 further includes an alignment mechanism 126 for alignment of the internal conduit 136 and retaining the internal conduit 136 in place. The alignment mechanism 126 includes an end fixation means and the filling material 158. In some embodiments, the end fixation means includes openings 156 defined in the end walls of the end caps 152. The openings 156 are configured to allow the internal conduit 136 to pass through. As a result, the internal conduit 136 is held in place by the openings 156 and the filling material 158.

In some embodiments, the end fixation means can include first and second alignment inserts 154 integrally formed with the end caps 152 for retaining the two ends of the internal conduit, respectively. The first and second alignment inserts 154 protrude through the end caps 152 toward the interior space 132 and are aligned with the openings 156. Like the end caps 152, the alignment inserts 154 can also be made from materials that do not degrade during prolonged elemental or ultraviolet exposure. In some embodiments, the alignment inserts 154 are made from insulative materials, such as insulative polymers. In some embodiments, the alignment inserts 154 are made from fiber reinforced polymers. In some embodiments, the alignment inserts 154 are made from UV stabilized materials, such as UV stabilized polyvinyl chloride (PVC). The alignment inserts 154 each has a sleeve shape. Because of this, the internal conduit 136 can be more reliably secured to the end caps 152.

In alternative embodiments, the alignment inserts 154 can be formed separately from the end caps 152. In such circumstances, each of the alignment inserts 154 extends through the respective end caps 152 toward the interior space 132 of the support member 115, and sleeves over the respective end of the internal conduit 136, thereby securing the first and second ends 146, 148 of the support member 115 to the respective end caps 152.

In some embodiments, when the support member 115 is assembled, the internal conduit 136 is fed into the interior space 132 of the support member body 138. The length of the internal conduit 136 is adjusted so that the internal conduit 136 has the same length as the support member body 138. The filling material 158 is then disposed into the interior space 132 of the support member 115 from one cap 152 to the other cap 152 to align the internal conduit 136. The alignment inserts 154 protruding through the openings 156 on the end caps 152 are then aligned with the first and second ends 146, 148 of the internal conduit 136. The alignment inserts 154 are then sleeved over the first and second ends 146, 148, and the end caps 152 are secured to the first and second ends 140, 142 of the support member 115. At the end of the process, the components inside the support member 115 are sealed from the outside environment. Subsequently, a wire is fed into one end of the internal conduit 136, passes through the length of the internal conduit 136 and exits out of the other end of the internal conduit 136.

Referring to FIGS. 2-4, in some embodiments, the alignment mechanism 126 further includes a first plurality of bushing members 166 extending between the upper and lower walls of the support member 115 and a second plurality of bushing members 168 extending between the left and right walls of the support member 115 to further retain the position of the internal conduit 136. The first plurality of bushing members and the second plurality of bushing members are positioned alternately along the length of the support member. The bushing members 166, 168 help further align the internal conduit 136 so as to hold the internal conduit 136 in place.

Referring to FIG. 5, in some embodiments, the support member can include two or more internal conduits 236 and 236'. The alignment mechanism 226 further includes a first plurality of bushing members 266 extending between the upper and lower walls of the support member 215 and a second plurality of bushing members 268 extending between the left and right walls of the support member 215. The first plurality of bushing members and the second plurality of bushing members are positioned alternately along the length of the support member. The bushing members 266, 268 help further align and retain the internal conduit 236, 236' so as to hold the internal conduit 236, 236' in place. The internal conduits 236, 236' can be used to each contain a bonding wire, or to each contain a grounding wire. In some embodiments, one of the internal conduits 236, 236' is used to contain a bonding wire, and the other one is used to contain a grounding wire.

Figure 6:
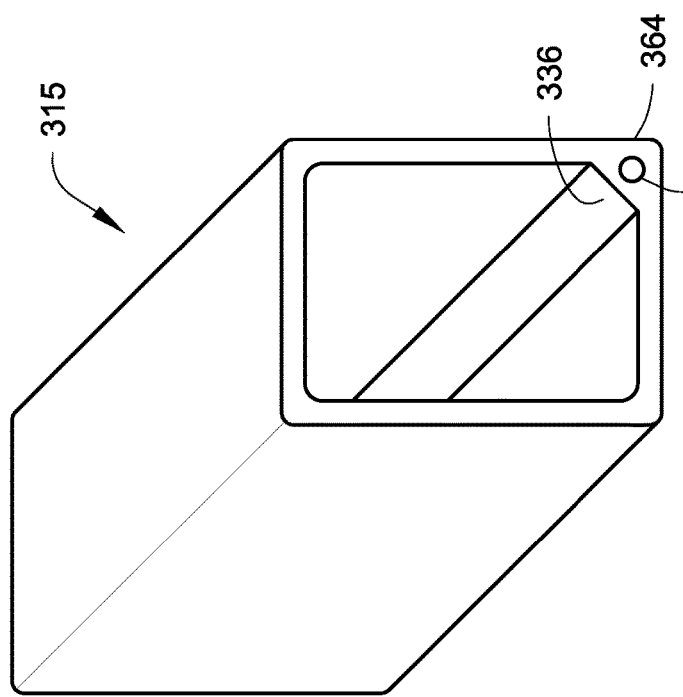
FIG. 6 illustrates a perspective view of one end of an even further embodiment of a power line support member.

Referring to FIG. 6, a power line support member 315 having a self-contained wiring path 334 enclosed by an internal conduit 336 is illustrated. In the embodiment depicted, the internal conduit 336 is made from the same material as that of the support member 315 and is integral to the support member 315. In such circumstances, if the support member 315 is made from fiberglass reinforced plastic (FRP), the internal conduit 336 made of the same material can be formed simultaneously with the support member 315 by a pultrusion process. It is to be understood that other suitable methods can be used to make the support member 315 with the internal conduit 336, as desired.

To fabricate the support member 315, a main mandrel can be designed to provide room for a second mandrel to be inserted in the corner of the support member 315. The second smaller mandrel would then form the self-contained wiring path 334 within a corner 364 of the support member 315. Alternatively, the main mandrel can be designed to provide room to include a structure that would form the self-contained wiring path 334. After the manufacturing process, the structure is removed to open up the self-contained wiring path 334.

Referring back to FIGS. 1A-B and 2-4, the internal conduit 36, 136 itself can be made of an electrically conductive material such that a bonding wire or a grounding wire can be connected to one end, both ends, or a middle portion of the internal conduit 36, 136 for equipotential bonding or grounding purpose.

Figure 7:
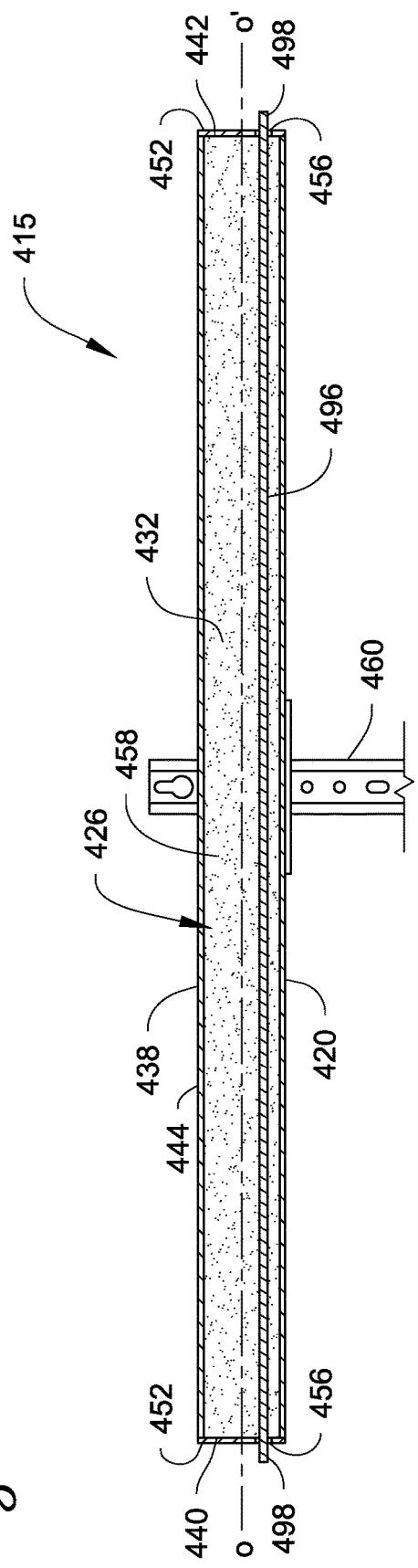
FIG. 7 illustrates a sectional view of a further embodiment of a power line support member having an electrically conductive bar or wire contained therein.

Alternatively, as illustrated in FIG. 7, an elongate, electrically conductive member 496, such as a bus bar or a wire, can be disposed in a power line support member 415 to replace the internal conduit(s) discussed above. As depicted in FIG. 7, the power line support member 415 takes the form of a crossarm 420. The support member 415 includes an elongated body 438 having an axis o-o', a first end 440, a second end 442 and a plurality of side walls 444 extending between the first and second ends 440, 442. The side walls 444 define an interior space 432 in which the elongate, electrically conductive member 496 extends through. The elongate, electrically conductive member 496 has two connection ends extending outside of the first and second ends 440, 442 of the support member 420, respectively. In alternative embodiments, one or both of the connection ends 498 of the elongate, electrically conductive member 496 do not extend out of the support member 415. The support member 415 includes first and second end caps 452 secured to its first and second ends 440, 442, respectively.

In some embodiments, the support member 415 further includes an alignment mechanism 426 for alignment of the elongate, electrically conductive member 496. The alignment mechanism 426 includes an end fixation means and the filling material 458. In some embodiments, the end fixation means includes openings 456 defined in the end walls of the end caps 452. The openings 456 are configured to allow the elongate, electrically conductive member 496 to pass through. In some embodiments, the interior space 432 can be filled with electrical insulative filling materials 458 to inhibit movement of the elongate, electrically conductive member 496 and improve insulative properties of the support member 415. As a result, the elongate, electrically conductive member 496 is held in place by the openings 456 and the filling material 458.

Aspects:

It is noted that aspect 1-17 below can be combined with any of aspects 18-32, aspects 33-40, aspect 41 and aspect 42. Also, any of aspects 18-32 below can be combined with any of aspects 33-40, aspect 41 and aspect 42. Also, any of aspects 33-40 below can be combined with any of aspect 41 and aspect 42.

1. A support system for supporting power distribution or transmission lines, comprising:
   a support pole having a first end and a second;
   an elongate crossarm attached to the support pole, proximate the first end of the support pole, the crossarm having a first end, a second end and one or more side walls extending between the first and second ends of the crossarm, the side walls of the crossarm defining an elongated interior space; and
   an internal conduit distinct from the elongate crossarm, the internal conduit extending axially through the interior space; the internal conduit extending along an axial direction of the crossarm,
   wherein the internal conduit is made from insulative material.

2. The support system of aspect 1, wherein the power transmission lines supported by the support system transmit power of 59 kv or above.

3. The support system of any of aspect 1 or 2, wherein the crossarm is made of fiberglass composite materials.

4. The support system of any of aspects 1-3, further comprising: a conductive wire extending through an inner space defined by the internal conduit.

5. The support system of any of aspects 1-4, further comprising insulator pins that secure the power distribution or transmission lines to the crossarm, wherein the conductive wire includes a bonding wire that connects lower ends of the insulator pins that are located underneath the lower surface of the crossarm.

6. The support system of any of aspects 1-5, wherein the conductive wire is a grounding wire entering the internal conduit through an opening defined in the side wall of the crossarm and then an opening defined in a side wall of the internal conduit, and exiting the internal conduit from an end of the internal conduit.

7. The support system of any of aspects 1-6, wherein a tube defining the internal conduit is made from polymeric material.

8. The support system of any of aspects 1-7, further comprising a cap that seals an end of the internal conduit.

9. The support system of any of aspects 1-8, wherein the crossarm includes an alignment mechanism for alignment of the internal conduit and retaining the internal conduit in place.

10. The support system of any of aspects 1-9, wherein the alignment mechanism includes an end fixation means and filing material.

11. The support system of any of aspects 1-10, wherein the end fixation means includes first and second openings defined in first and second end caps of the internal conduit, respectively, the openings are configured to allow the internal conduit to pass through.

12. The support system of any of aspects 1-11, wherein the end fixation means includes first and second sleeve-shape alignment inserts integrally formed with first and second end caps of the internal conduit, the alignment inserts being configured to secure first and second ends of the internal conduit in place.

13. The support system of any of aspects 1-12, wherein the alignment inserts are made from UV stabilized polyvinyl chloride (PVC).

14. The support system of any of aspects 1-13, wherein the filling material fills a volume of the interior space completely.

15. The support system of any of aspects 1-14, wherein the filling material is an electrical insulating filling material.

16. The support system of any of aspects 1-15, wherein the alignment mechanism includes a first plurality of bushing members extending between the upper and lower walls of the crossarm, and a second plurality of bushing members extending between the left and right walls of the crossarm.

17. The support system of any of aspects 1-16, wherein the first plurality of bushing members and the second plurality of bushing members are positioned alternately along a length of the crossarm.

18. A support member for supporting power distribution or transmission lines, comprising:
   an elongated body;
   a first end and a second end;
   one or more side walls extending between the first and second ends;
   an interior space defined by the side walls; and an internal conduit extending along an axial direction of the support member in the interior space.

19. The support member of aspect 18, wherein the support member takes a form of a support pole, a crossarm supportable by the crossarm, or a brace arm used in utility line support systems.

20. The support member of aspect 18 or 19, wherein the support member is made of fiberglass composite materials.

21. The support member of any of aspects 18-20, further comprising: a conductive wire extending through an inner space defined by the internal conduit.

22. The support member of any of aspects 18-21, wherein the conductive wire is a grounding wire entering the internal conduit through an opening defined in the side wall of the support member and then an opening defined in a side wall of the internal conduit, and then the grounding wire exits the internal conduit from an end of the internal conduit.

23. The support member of any of aspects 18-22, wherein a tube defining the internal conduit is made from polymeric material.

24. The support member of any of aspects 18-23, further comprising a cap that seals an end of the internal conduit.

25. The support member of any of aspects 18-24, further comprising: an alignment mechanism for alignment of the internal conduit and retaining the internal conduit in place.

26. The support member of any of aspects 18-25, wherein the alignment mechanism includes an end fixation means and filing material.

27. The support member of any of aspects 18-26, wherein the end fixation means includes first and second openings defined in first and second end caps of the internal conduit, respectively, the openings are configured to allow the internal conduit to pass through.

28. The support member of any of aspects 18-27, wherein the end fixation means includes first and second sleeve-shape alignment inserts integrally formed with first and second end caps of the internal conduit, the alignment inserts being configured to secure first and second ends of the internal conduit in place.

29. The support member of any of aspects 18-28, wherein the alignment inserts are made from UV stabilized polyvinyl chloride (PVC).

30. The support member of any of aspects 18-29, wherein the filling material fills a volume of the interior space completely.

30. The support member of any of aspects 18-29, wherein the filling material is an electrical insulating filling material.

31. The support member of any of aspects 18-30, wherein the alignment mechanism includes a first plurality of bushing members extending between the upper and lower walls of the crossarm, and a second plurality of bushing members extending between the left and right walls of the crossarm.

32. The support member of any of aspects 18-31, wherein the first plurality of bushing members and the second plurality of bushing members are positioned alternately along a length of the crossarm.

33. A method of making a power line support member, comprising:
feeding the internal conduit fed into the interior space of the support member;
adjusting a length of the internal conduit so that the internal conduit has a same length as the support member;
disposing a filling material into the interior space of the support member from one cap to the other cap to retain the internal conduit;
protruding an alignment insert through an opening defined in the end cap; and
sealing the conduit from an outside environment.

34. The method of aspect 33, wherein the support member takes a form of a support pole, a crossarm supportable by the crossarm, or a brace arm used in utility line support systems.

35. The method of aspect 33 or 34, further comprising:
extending a grounding wire into the internal conduit through an opening defined in the side wall of the support member and then through an opening defined in a side wall of the internal conduit;
exiting the internal conduit from an end of the internal conduit; and
connecting upper ends of insulator pins that are located above an upper surface of the support member.

36. The method of any of aspect 33-35, wherein a tube defining the internal conduit is made from polymeric material.

37. The method of any of claims 33-36, further comprising: sealing an end of the internal conduit by a cap.

38. The method of any of aspect 33-37, wherein the alignment insert is made from UV stabilized polyvinyl chloride (PVC).

39. The method of any of aspect 33-38, wherein the filling material is an electrical insulating filling material.

40. The method of any of aspect 33-39, further comprising:
positioning a first plurality of bushing members between the upper and lower walls of the support member; and
positioning a second plurality of bushing members between the left and right walls of the support member,
wherein the first plurality of bushing members and the second plurality of bushing members are positioned alternately along a length of the crossarm.

41. A method of using a power line support member, comprising:
inserting a bonding wire in an internal conduit of the power line support member;
connecting one end of the bonding wire to an insulator pin that secures an insulator to the support member; and
connecting another end of the bonding wire to another insulator pin that secures another insulator to the same support member for equipotential bonding.

42. A method of using a power line support member, comprising:
inserting a grounding wire in an internal conduit of the power line support member;
connecting one end of the grounding wire to an insulator pin that secures an insulator to the support member; and
connecting another end of the grounding wire to another insulator pin that secures another insulator to the same support member for equipotential bonding.

A number of embodiments of the invention have been described. Nevertheless, it will be understood that various modifications may be made without departing from the spirit and scope of the invention. Accordingly, other embodiments are within the scope of the following claims.

The invention claimed is:

1. A support system for supporting power distribution or transmission lines, comprising:
a support pole having a first end and a second;
an elongate crossarm attached to the support pole, proximate the first end of the support pole, the crossarm having a first end, a second end and one or more side walls extending between the first and second ends of the crossarm, the side walls of the crossarm defining an elongated interior space; and
an internal conduit formed in the interior space of the crossarm; the internal conduit extending along an axial direction of the crossarm;

a conductive wire extending through an inner space defined by the internal conduit; and first and second electrical components, wherein the conductive wire includes a bonding wire that connects the first and second electrical components for equipotential bonding.

2. The support system of claim 1, wherein the crossarm is made of fiberglass composite materials.

3. The support system of claim 1, further comprising another conductive wire acting as grounding wire for grounding of an electrical component.

4. The support system of claim 3, further comprising another internal conduit, wherein the other conductive wire extends into the other internal conduit through an opening defined in the side wall of the support member, exits from an end of the other internal conduit, and connects a third electrical component to a ground post.

5. The support system of claim 1, wherein a tube defining the internal conduit is made from polymeric material.

6. The support system of claim 1, further comprising a cap that seals an end of the internal conduit.

7. The support system of claim 1, wherein the internal conduit is made from insulative material.

8. The support system of claim 1, wherein the internal conduit is made from electrically conductive material.

9. The support system of claim 1, wherein the internal conduit and the crossarm are separate structural members.

10. The support system of claim 1, wherein a tube defining the internal conduit is made from cross-lined polyethelyne.

11. The support system of claim 1, wherein a tube defining the internal conduit is made from fiberglass composite materials.

12. A method of making the power line support member of claim 1, comprising:

feeding the internal conduit into the interior space of the support member;

adjusting a length of the internal conduit so that the internal conduit has a same length as the support member.

13. The method of claim 12, further comprising:

disposing a filling material into the interior space of the support member from one cap to the other cap to retain the internal conduit;

protruding an alignment insert through an opening defined in the end cap; and sealing the conduit from an outside environment.

14. The method of claim 13, wherein the support member takes a form of a support pole, a crossarm supportable by the crossarm, or a brace arm used in utility line support systems.

15. The method of claim 13, further comprising:

extending another conducting wire into another internal conduit through an opening defined in the side wall of the support member;

exiting from an end of the other internal conduit; and connecting a third electrical component to a ground post by the other conducting wire.

* * * * *